United States Patent
Hayashi et al.

(10) Patent No.: US 6,267,910 B1
(45) Date of Patent: Jul. 31, 2001

(54) ANTIFERROELECTRIC LIQUID CRYSTAL COMPOSITION

(75) Inventors: Hitoshi Hayashi, Okazaki; Akira Takeuchi, Nishio; Katsuhide Kikuchi, Kariya; Kenji Takigawa, Nishio, all of (JP)

(73) Assignee: Nippon Soken, Inc., Nishio (JP)

( * ) Notice: Subject to any disclaimer, the term of this patent is extended or adjusted under 35 U.S.C. 154(b) by 0 days.

(21) Appl. No.: 08/589,577

(22) Filed: Jan. 22, 1996

Related U.S. Application Data

(63) Continuation of application No. 08/423,048, filed on Apr. 17, 1995, now abandoned.

(30) Foreign Application Priority Data

Apr. 18, 1994 (JP) .................................................. 6-078578

(51) Int. Cl.$^7$ .......................... C09K 19/52; C09K 19/12; C09K 19/20
(52) U.S. Cl. .............................. 252/299.01; 252/299.64; 252/299.65; 252/299.66; 252/299.61; 252/299.63
(58) Field of Search .................... 252/299.01, 299.64, 252/299.65, 299.66, 299.61, 299.63

(56) References Cited

U.S. PATENT DOCUMENTS

| | | | |
|---|---|---|---|
| 4,576,732 | 3/1986 | Isogai | 252/299.65 |
| 4,921,632 | 5/1990 | Nakamura et al. | 252/299.1 |
| 5,046,823 | 9/1991 | Mori | 359/56 |
| 5,076,962 | 12/1991 | Furukawa et al. | 252/299.65 |
| 5,110,498 | 5/1992 | Suzuki et al. | 252/299.66 |
| 5,171,471 | 12/1992 | Suzuki et al. | 252/299.61 |
| 5,184,847 | 2/1993 | Suzuki et al. | 252/299.65 |
| 5,204,028 | 4/1993 | Suzuki | 252/299.67 |
| 5,262,086 | 11/1993 | Suzuki et al. | 252/299.65 |
| 5,264,150 | 11/1993 | Yui et al. | 252/299.64 |
| 5,322,639 | 6/1994 | Kawabata et al. | 252/299.62 |
| 5,330,678 | 7/1994 | Okabe et al. | 252/299.62 |
| 5,344,586 | 9/1994 | Suzuki et al. | 252/299.64 |
| 5,352,382 | * 10/1994 | Johno et al. | 252/299.65 |
| 5,364,560 | 11/1994 | Mizukami et al. | 252/299.65 |
| 5,364,561 | 11/1994 | Isozaki et al. | 252/299.65 |
| 5,378,392 | * 1/1995 | Marashiro et al. | 252/299.01 |
| 5,393,460 | * 2/1995 | Okabe et al. | 252/299.65 |
| 5,424,005 | 6/1995 | Suzuki et al. | 252/299.65 |
| 5,433,887 | 7/1995 | Isozaki et al. | 252/299.64 |
| 5,534,190 | 7/1996 | Johno et al. | 252/299.65 |

FOREIGN PATENT DOCUMENTS 330491   8/1989   (EP) .
339987   11/1989  (EP) .

(List continued on next page.)

OTHER PUBLICATIONS

Y. Suzuki et al., "New Fluorine–Containing Ferroelectric Liquid Crystal Compounds Showing Tristable Switching," Liquid Crystals, 1989, vol. 6, No. 2, 167–174.

(List continued on next page.)

Primary Examiner—Shean C. Wu
(74) Attorney, Agent, or Firm—Pillsbury Winthrop LLP

(57) ABSTRACT

An antiferroelectric liquid crystal composition having a chiral smectic $C_A^*$ phase composed by blending liquid crystal composition-constituting compounds having the same direction of inclination of optic axis produced by application of an electric field and/or comprised of a mixture of two enantiomers of a liquid crystal material; one having the stereosense (+) and the other having the stereosense (−). The stereosense is defined so that, when the molecule is viewed so that the bond between the core group and the asymmetric carbon is behind the asymmetric carbon atom, the stereosense is (+) if the remaining three groups (or atoms) are arranged clockwise in order of length of the groups (or, if the groups are the same length, in order of their volume), and the stereosense is (−) if the groups are arranged counter clockwise.

9 Claims, 2 Drawing Sheets

FOREIGN PATENT DOCUMENTS

| | | |
|---|---|---|
| 0517504A1 | 12/1992 | (EP) . |
| 0525737A1 | 2/1993 | (EP) . |
| 0562627A1 | 9/1993 | (EP) . |
| 0582519A1 | 2/1994 | (EP) . |
| 582 468 | 2/1994 | (EP) . |
| 61-174294 | 8/1986 | (JP) . |
| 61-231082 | 10/1986 | (JP) . |
| 63-110278 | 5/1988 | (JP) . |
| 1-139551 * | 6/1989 | (JP) . |
| 1-213390 | 8/1989 | (JP) . |
| 1-316339 | 12/1989 | (JP) . |
| 1-316367 | 12/1989 | (JP) . |
| 2-28128 | 1/1990 | (JP) . |
| 2-69440 * | 3/1990 | (JP) . |
| 5-65486 | 3/1993 | (JP) . |
| 5-186402 | 7/1993 | (JP) . |
| 6-25098 | 2/1994 | (JP) . |
| 6-25100 | 2/1994 | (JP) . |
| 6-32764 | 2/1994 | (JP) . |
| 6-184537 | 7/1994 | (JP) . |
| 6-192657 | 7/1994 | (JP) . |
| 6-271852 | 9/1994 | (JP) . |

OTHER PUBLICATIONS

Nishiyama et al., "Effect of Size of the Lateral Substituent at the Chiral Centre on the Stability of Some Chiral Smectic Liquid–crystalline Phases" Journal Of Materials Chemistry 3(1993), No. 2, Cambridge, GB, pp. 149–159.

Meyer: "Terroelectric Liquid Crystals; A Review", Mol-.Cryst.Liq.Cryst., vol. 40, (1977) pp. 33–48.

Chandani, et al: "Tristable Switching in Surface Stabilized Ferroelectric Liquid Crystals with a Large Spontaneous Polarization", Japanese Journal of Applied Physics, vol. 27, No. 5, May, 1988, pp. L729–L732.

Nikkan Kogyo News Paper Co. Ltd., "Liquid Crystal Device Hand Book", edited by the 142 Committee of Japan Science Promotion Association, (1989), p. 69.

* cited by examiner

EXAMPLE: R MODIFICATION-MHPOBC

WHEN OBSERVING FROM THE OPPOSITE SIDE OF THE CORE, ①→②→③ IS THE LEFT CIRCUIT. THUS THE STEREOSCOPIC SENSE IS -.

ANTIFERROELECTRIC LIQUID CRYSTAL COMPOSITION

This is a continuation-in-part (CIP) continuation of Application Ser. No. 08/423,048, filed on Apr. 17, 1995, which was abandoned upon the filing hereof:

BACKGROUND OF THE INVENTION

1. Field of the Invention

This invention relates to a liquid crystal composition. Particularly this invention relates to a liquid crystal composition having an ability to indicate an antiferroelectric phase (chiral smectic $C_A$ phase, hereinafter abbreviated to "$SmC_A^*$ phase"). More particularly, this invention relates to an antiferroelectric liquid crystal composition suitable for use in a liquid crystal indication element.

2. Description of the Related Art

Recently, liquid crystal displays have become widely used as indication elements, due to their thin thickness, light weight, low electricity consumption etc. However, most of these displays use TN (Twisted Nematic) type displays comprising a nematic liquid crystal. Since the driving of the indication method of the TN type is based on the anisotropy of the dielectric constant of the liquid crystal, the speed of response is slow, and an improvement is required.

In contrast, liquid crystal devices comprising the chiral smectic C phase (hereinafter abbreviated as "SmC* phase") liquid crystal, which is ferroelectric and was discovered by Meyer et. al., has a high speed response and memory characteristics which are not attained by nematic liquid crystals. Thus, the application of ferroelectric liquid crystals to a ferroelectric liquid crystal display is being vigorously researched. However, the good orientation and memory characteristics required for this indication method are difficult to realize in a real cell. For example, the cell has the problems that it is not resistant to external shocks etc., and many problems must be solved.

On the other hand, recently, an antiferroelectric phase (hereinafter abbreviated as "$SmC_A^*$ phase") has been discovered which shows three stable states on the lower temperature side of said SmC* phase, by Chandani et. al. This antiferroelectric liquid crystal shows a thermodynamically stable phase wherein dipoles are arranged in antiparallel in every adjacent layer, and exhibits an electric field-induced phase transition between the antiferroelectric phase and the ferroelectric phase which is characterized by a clear threshold value and double hysteresis characteristics in response to an applied voltage. Research on a new indication method utilizing this switching behavior has already begun.

SUMMARY OF THE INVENTION

Figure 1:
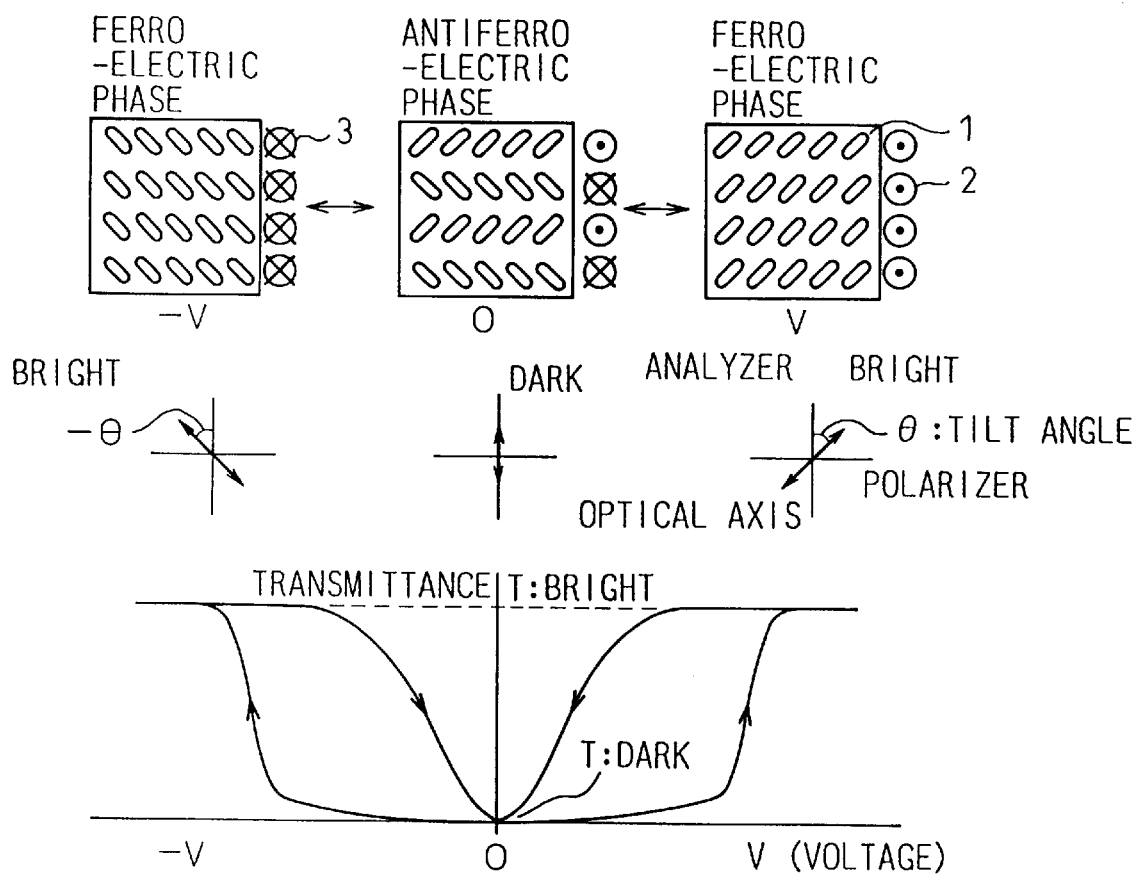
FIG. 1 is a view showing states of inclinations of liquid crystal molecules when voltages are applied and not applied to a ferroelectric liquid crystal material.
Figure 2:
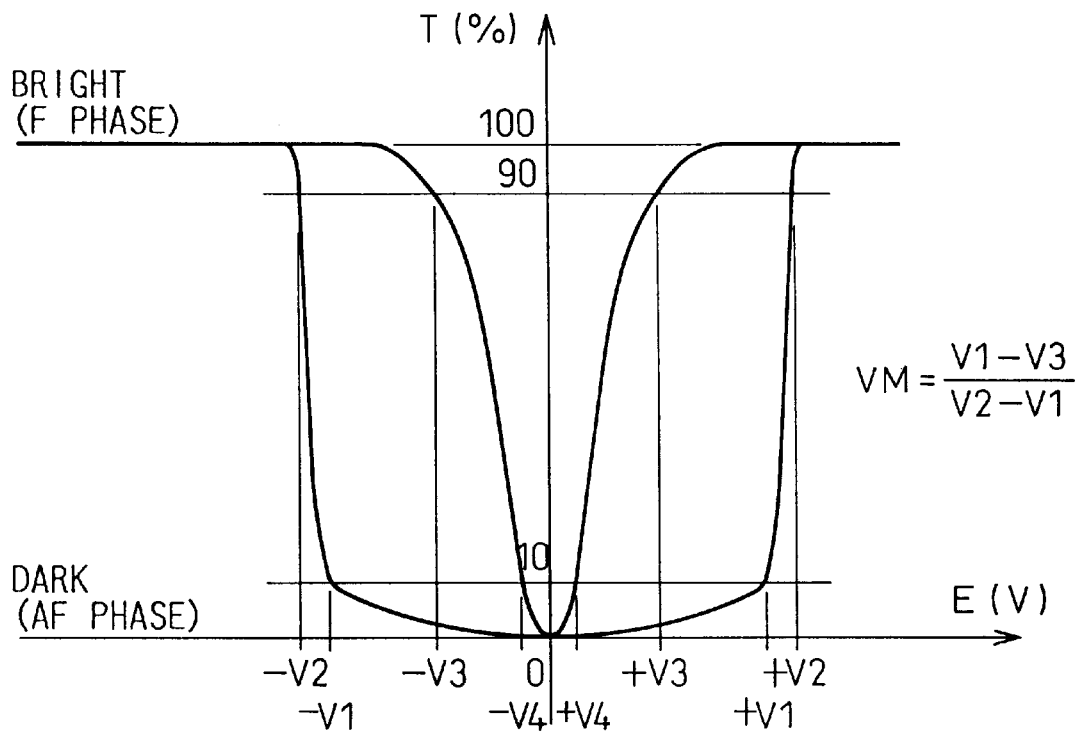
FIG. 2 is a graph showing the voltage-transmittance characteristics of a liquid crystal indication element.

The indication element of the liquid crystal composition having the $SmC_A^*$ phase exhibits an antiferroelectric phase (AF) when an electric field is not applied, and exhibits a ferroelectric phase (F) when an electric field is applied, and presents a dark and bright state, respectively, as shown in FIG. 1. Although the response speed between the states [(τr (AF→F), τd (F→AF)] is desired to be sufficiently high to obtain a good indication quality, a guiding principle for accomplishing this when preparing a liquid crystal composition by blending liquid crystal composition-consisting compounds has not been made clear. Further, in order to drive the liquid crystal element utilizing the double hysteresis characteristics in the voltage-transmittance characteristics of the indication element shown in FIG. 2, provided that the voltage which shows the transmittance of 10% is V1 and V4, and the voltage which shows the transmittance of 90% is V2 and V3 as shown in FIG. 2, it is required that (1) each of the threshold voltages is low, and that (2) the voltage width presented by V1–V3 is wide, the voltage width presented by V2–V1 is narrow, and the VM [=(V1–V3)/(V2–V1)] defined by the ratio of the above voltage widths is as large as possible, preferably 2 or larger. However, a guiding principle for accomplishing this also is not clear.

An object of this invention is to provide these guiding principles, to improve the liquid crystal characteristics.

A feature of this invention relates to response speed. This feature is an antiferroelectric liquid crystal composition having chiral smectic $C_A^*$ phase composed by blending liquid crystal composition-constituting compounds each having an asymmetric carbon (represented by C*) having the same direction of inclination of optic axis (hereinafter the direction of inclination of the optic axis will be referred to as "tilt sense") produced by application of an electric field.

The inventors of this invention targeted the direction of inclination of an optic axis (tilt sense) of a liquid crystal composition-constituting compound (hereinafter referred to as "liquid crystal material" or "material") produced when an electric field is applied and the compound has made a transition to the ferroelectric phase, and have found that a high response speed liquid crystal composition is obtained by blending materials which have the same direction. That is to say, the antiferroelectric liquid crystal material cancel polarization components between adjacent layers and does not produce a spontaneous polarization, and the optic axis does not deviate from the layer normal direction. However, when a voltage is applied to the liquid crystal, the given outside electric field components interact, and the liquid crystal material transfers to the ferroelectric phase and the optic axis inclines. After detailed examination of the inclination directions of axes of several hundreds of materials, the present inventors have found that there is a material species that, when viewed from above, so that the bottom surface is defined to be at the standard voltage, inclines clockwise when a positive voltage is applied and counter clockwise when a negative voltage is applied (tilt sense +), and another material species that inclines counter clockwise when a positive voltage is applied and clockwise when a negative voltage is applied (tilt sense –). According to this invention, a liquid crystal composition superior in τr and τd was obtained by selecting materials that are the same in the herein proposed "tilt sense". The proportion of the liquid crystal composition constituting-compound having the same tilt sense is preferably not less than 70% by weight, more preferably not less than 90% by weight. Further, the present inventors have found that when the liquid crystal composition comprising the liquid crystal composition-constituting compounds having the same tilt sense has a saturation value (hereinafter described as "Ps") of spontaneous polarization of not less than 200 $nC/cm^2$, a high response speed is obtained. The reason of the fact is thought to be because the spontaneous polarization acts as a driving source in each of the switching mode.

The other feature of this invention relates to hysteresis characteristics. This feature is an antiferroelectric liquid crystal composition having a chiral smectic $C_A^*$ phase comprised of a mixture of two enantiomers; each having an asymmetric carbon (represented by C*) one having the stereosense (+) and the other having the stereosense (−). The stereosense is defined so that, when the molecule is viewed so that the bond between the core group and the asymmetric carbon is behind the asymmetric carbon atom, the stereosense is (+) if the remaining three groups (or atoms) are arranged clockwise in order of length of the groups (or, if the groups are the same length, in order of their volume), and the stereosense is (−) if the groups are arranged counter clockwise. The above "core" is an atomic group which is comprised of at least two cyclic groups, e.g. aromatic rings, heterocycles and cyclohexane rings which may have substituent(s), and combination groups connected to the cyclic rings e.g., —COO—, a direct bond etc.

The present inventors focused on the peculiarity of the three dimensional configuration around the asymmetric carbon in the liquid crystal material and found that in order to achieve the above object, it is effective to select materials having different stereosenses and mix them, to form a composition. The above peculiarity of the three dimensional configuration does not mean the R and S enantiomers usually referred to in relation to the asymmetric carbon, but means two configurations with the same molecular formula, relating to the three atoms or three atomic groups other than the core connected to the asymmetric carbon of the liquid crystal material in the order of length (when two or more of the atoms or atomic groups have the same length, in the order of the volume of the atoms or atomic groups). The differences in configuration are considered to affect the spatial orientation of the liquid crystals at the time of mixing liquid crystal materials.

Figure 3:
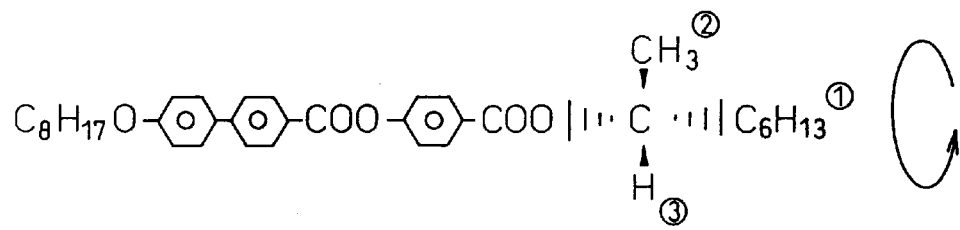
FIG. 3 is a view illustrating the stereoscopic sense of the liquid crystal of this invention.

As shown in FIG. 3, when the core is positioned in the opposite side, the case where the configuration of the remaining three substituents are in clockwise order has been defined as +, and the case where the configuration of the remaining three substituents are in counter clockwise order has been defined as −, which has been designated as stereosense. The inventors have found that in contrast to mixing of liquid crystal materials having the same stereosense, mixing of liquid crystal materials having different stereosense generally causes a decrease of the threshold voltage and an increase of VM due to a decrease of V3. The reason for this is thought to be that, by mixing liquid crystal materials having different stereosenses, a change occurs in the interactions among liquid crystal materials, so that, in comparison with the ferroelectric phase, the antiferroelectric phase becomes unstable.

According to this feature, VM can be made at least 2.

Examples of a compound having a tilt sense (+) include hydrocarbon system chiral side chain materials and fluorohydrocarbon system chiral side chain materials, having an absolute configuration of S modification, more concretely S enantiomers of the compounds having the following chemical constitution formulae 1 to 15.

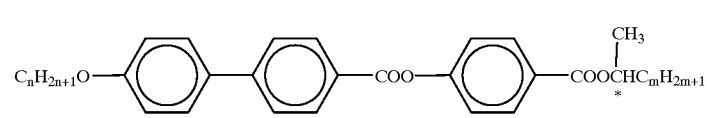

1

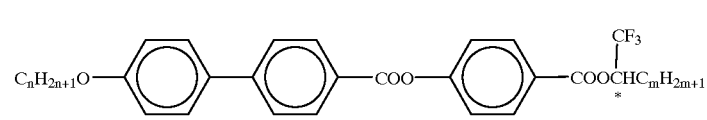

2

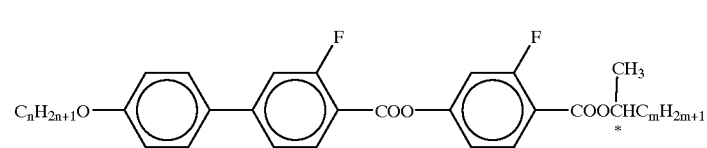

3

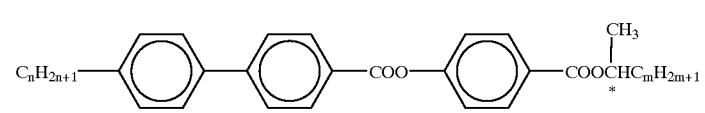

4

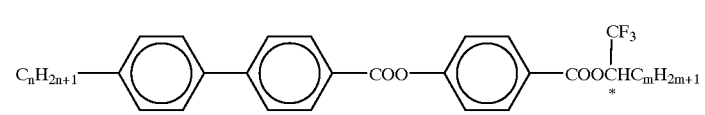

5

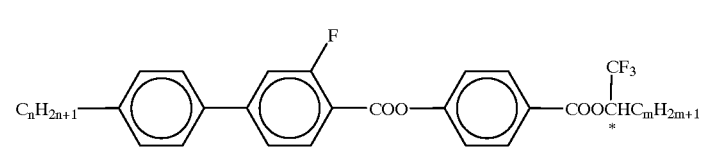

6

7

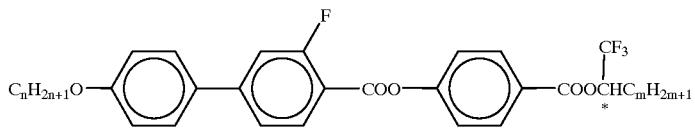

8

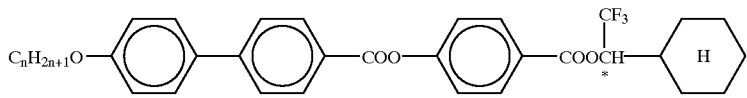

9

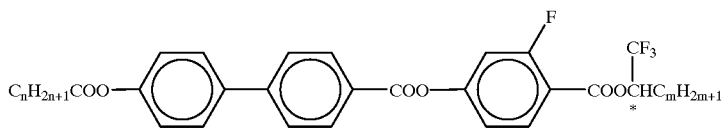

10

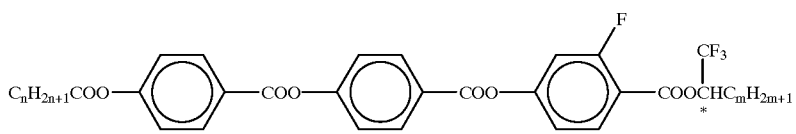

11

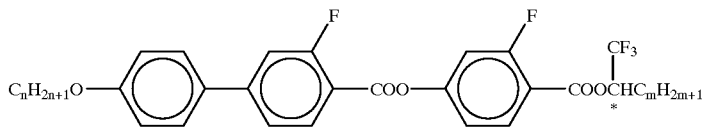

12

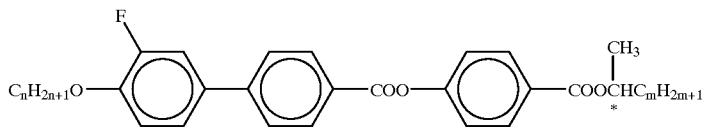

13

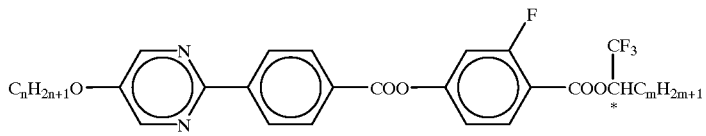

14

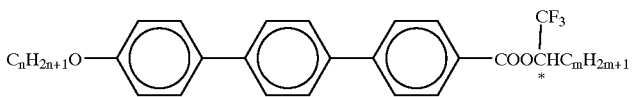

15

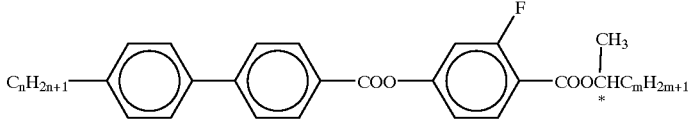

In the above formulae 1 to 15, n is an integer from 4 to 14, and m is an integer from 2 to 14. Preferably, n is an integer from 5 to 12, and m is an integer from 4 to 12.

Examples of the compound having tilt sense (−) include hydrocarbon system chiral side chain materials and fluorohydrocarbon system chiral side chain materials, having an absolute configuration of R modification, more concretely R modification of the compounds having the above chemical constitution formulae 1 to 15.

Examples of the compound having stereosense (+) include fluorohydrocarbon system chiral side chain materials having an R absolute configuration and hydrocarbon system chiral side chain materials having an S absolute configuration, more concretely R configuration of the compounds having the following chemical formulae 16 to 25 and S modification of the compounds having the following chemical formulae 26 to 30. In these formulae 16 to 30, n is an integer from 4 to 14, and m is an integer from 2 to 14, provided that in formula 30, m is an integer from 3 to 14.

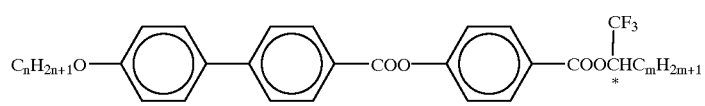
16
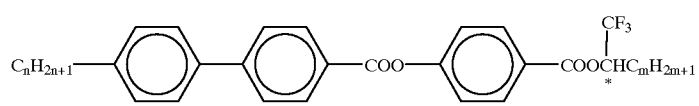
17
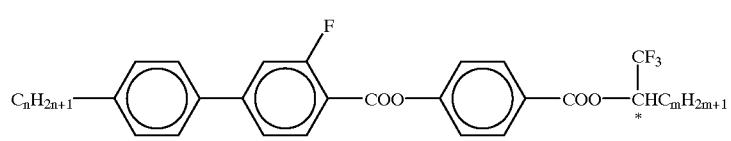
18
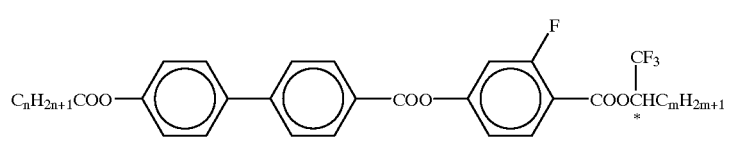
19
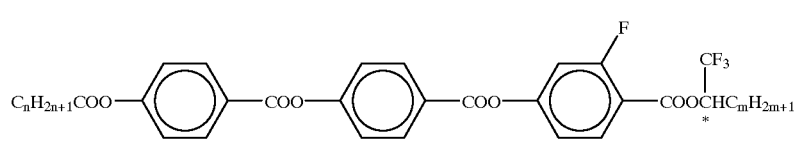
20
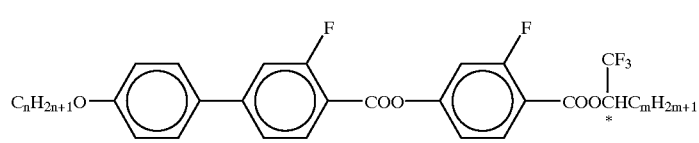
21
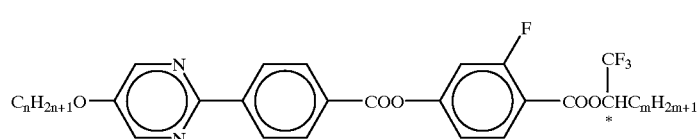
22
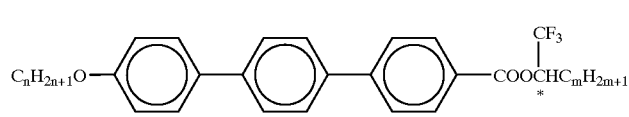
23
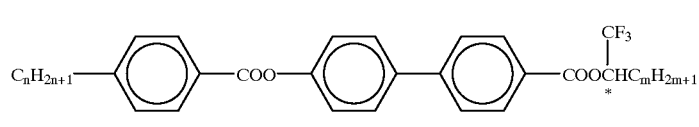
24
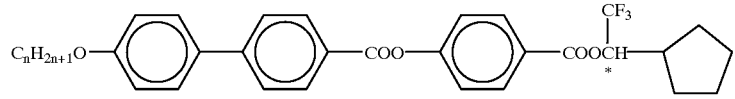
25
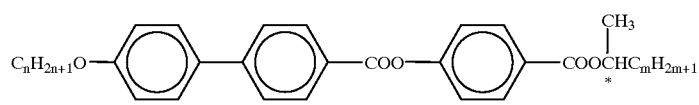
26
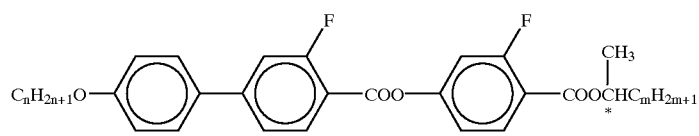
27

-continued

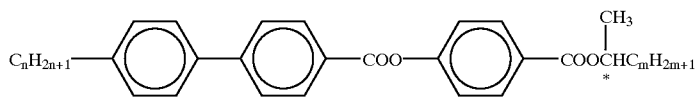

28

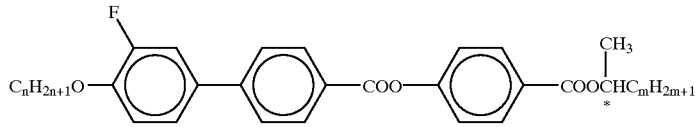

29

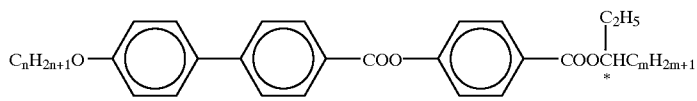

30

Examples of compounds having stereosense (−) include S enantiomers of the compounds represented by the above formulae 16 to 25 and R enantiomers of the compounds represented by the above constitutional formulae 26 to 30.

Using compounds No. 1 to 6 shown in Table 1, liquid crystal compositions shown in the examples shown below were prepared. The liquid crystal compositions were injected into liquid crystal cells having gaps of 2 μm. After the injection, the cell was heated to a temperature at which the liquid crystal became an isotropic liquid, and thereafter cooled to room temperature at a rate of 2° C./min, to obtain an antiferroelectric liquid crystal element. The response speed was determined by applying a rectangular wave of 50V. The hysteresis characteristics were determined by measuring an intensity variance of the transmitted light under a crossed Nicols by applying a chopping wave of 50V-1 Hz to the cell.

TABLE 1

| Compound No. | Constitutional Formula |
|---|---|
| 1 | $C_8H_{17}O-\bigcirc-\bigcirc-COO-\bigcirc-COOCH(CH_3)C_6H_{13}$ |
| 2 | $C_8H_{17}O-\bigcirc-\bigcirc-COO-\bigcirc-COOCH(CF_3)C_6H_{13}$ |
| 3 | $C_{10}H_{21}O-\bigcirc-\bigcirc-COO-\bigcirc-COOCH(CF_3)C_6H_{13}$ |
| 4 | $C_{11}H_{23}O-\bigcirc-\bigcirc-COO-\bigcirc-COOCH(CF_3)C_6H_{13}$ |
| 5 | $C_{10}H_{21}O-\bigcirc-\bigcirc-COO-\bigcirc-COOCH(CF_3)C_6H_{13}$ |
| 6 | $C_{11}H_{23}O-\bigcirc-\bigcirc-COO-\bigcirc-COOCH(CF_3)C_6H_{13}$ |

EXAMPLE 1

From the compounds shown in Table 1, compound Nos. 1, 2 and 5 were selected and used to prepare composition Nos. I and II as shown in Table 2.

In composition No. I, the components were selected so that the tilt senses of all compounds were the same (−). On the other hand, in composition No. II, some of the compounds was selected to have different tilt senses from the others, to prepare a material with a blend of tilt senses. The results of response speed of the compositions are also shown in the Table 2. Composition No. I, wherein the tilt senses are the same, exhibited superior response characteristics for τr and τd (both measured at 40° C.). Incidentally, the tilt sense reverses in a compound having the same chemical constitution by changing the absolute configuration.

Both of the response speeds decreased in accordance with decrease of the proportion of the R enatiomer. When the proportion of the R enantiomer is 60 wt %, both of the response speeds increased to more than 500 μs which is as slow as a conventional nematic liquid crystal, and the advantage of "high speed response" is lost.

TABLE 2

| Composition No. | Compound No. | Blend Ratio (wt %) | Absolute Configuration | Tilt Sense | τr (μs) | τd (μs) | Ps (nC/cm$^2$) |
|---|---|---|---|---|---|---|---|
| I | 2 | 16 | R | − | 26 | 105 | 220 |
|   | 5 | 68 | R | − |    |     |     |
|   | 1 | 16 | R | − |    |     |     |
| II | 2 | 16 | R | − | 126 | 208 | 170 |
|   | 5 | 68 | R | − |    |     |     |
|   | 1 | 16 | S | + |    |     |     |

EXAMPLE 2

From the compounds shown in Table 1, compound Nos. 2 and 5 were selected and used to prepare composition Nos. III and IV as shown in Table 3.

In composition No. III, the components were selected so that the tilt senses of all compounds was the same (−). On the other hand, in composition No. IV, some of the compounds was elected so that there were isomers with opposite tilt senses to each other, to prepare a material with a blend of tilt senses. The determined results of response speed of the compositions are also shown in Table 3. The composition No. III wherein the tilt senses are the same exhibited superior response characteristics for τr and τd (both measured at 30° C.).

TABLE 3

| Composition No. | Compound No. | Blend Ratio (wt %) | Absolute Configuration | Tilt Sense | τr (μs) | τd (μs) | Ps (nC/cm$^2$) |
|---|---|---|---|---|---|---|---|
| III | 2 | 20 | R | − | 56 | 153 | 240 |
|     | 5 | 80 | R | − |    |     |     |
| IV  | 2 | 10 | R | − | 67 | 336 | 200 |
|     | 2 | 10 | S | + |    |     |     |
|     | 5 | 80 | R | − |    |     |     |

EXAMPLE 3

In compound No. 2 in the Table 1, the proportion of the S enantiomer and the R enantiomer was changed to make the compositions, V, VI and VII, and τr and τd was determined.

TABLE 4

| Composition No. | Compound No. | Blend Ratio (wt %) | Absolute Configuration | Tilt Sense | τr (μs) | τd (μs) | Ps (nC/cm$^2$) |
|---|---|---|---|---|---|---|---|
| V | 2 | 100 | R | − | 9 | 24 | 220 |
| VI | 2 | 70 | R | − | 101 | 121 | 90 |
|    | 2 | 30 | S | + |     |     |    |
| VII | 2 | 60 | R | − | >500 | >500 | 40 |
|     | 2 | 40 | S | + |      |      |    |

EXAMPLE 4

From the compounds shown in Table 1, compound Nos. 2, 3, 4, 5 and 6 were selected and used to prepare composition Nos. VIII and IX as shown in Table 4.

In composition No. VIII, the components were selected so that the tilt senses of all compounds was the same (−). On the other hand, in composition No. IX, the compound No. 2 was selected so that it consisted of materials, with different stereosenses, to prepare a material with a mixture of stereosenses. The results (determined at 30° C.) of the threshold voltage and VM of the compositions are also shown in the Table 5. The composition No. VIII exhibited a low threshold voltage and a sufficiently large VM. Incidentally, the stereosense reverses in a compound having the same chemical constitution by changing the absolute configuration.

The liquid crystal composition according to this invention exhibits excellent hysteresis characteristics (low threshold value and high driving margin) and/or high speed response characteristics, so that it can be used to manufacture a practically excellent liquid crystal element.

What is claimed is:

1. An antiferroelectric liquid crystal composition having a chiral smectic $C_A$* phase composed by blending liquid crystal composition-constituting compounds, each having an asymmetric carbon and the same direction of inclination of optical axis (hereinafter referred to as "tilt sense") produced by application of an electric field, and the composition having a chiral smectic $C_A$* phase comprised of a mixture of two enantiomers each having an asymmetric carbon; one having the stereosense (+) and the other having the stereosense (−), the stereosense being defined so that, when the molecule is viewed so that the bond between the core group and the asymmetric carbon is behind the asymmetric carbon atom, the stereosense is (+) if the remaining three groups (or atoms) are arranged clockwise in order of length of the groups (or, if the groups are the same length, in order of their volume), and the stereosense is (−) if the groups are arranged counter-clockwise.

2. The composition according to claim 1, wherein the liquid crystal composition-constituting compounds having the same tilt sense (+) are selected from S enantiomers of the compounds represented by the following constitutional formulae, wherein n is an integer selected from 4 to 14, and m is an integer selected form 2 to 14.:

TABLE 5

| Composition No. | Compound No. | Blend Ratio (wt %) | Absolute Configuration | Stereo-Sense | V1 | V2 | V3 | V4 | VM |
|---|---|---|---|---|---|---|---|---|---|
| VIII | 2 | 10 | S | − | 33 | 39 | 10 | 2 | 3.8 |
| | 3 | 6 | R | + | | | | | |
| | 4 | 4 | R | + | | | | | |
| | 5 | 53 | R | + | | | | | |
| | 6 | 27 | R | + | | | | | |
| IX | 2 | 10 | R | + | 33 | 42 | 17 | 3 | 1.8 |
| | 3 | 6 | R | + | | | | | |
| | 4 | 4 | R | + | | | | | |
| | 5 | 53 | R | + | | | | | |
| | 6 | 27 | R | + | | | | | |

EXAMPLE 5

From the compounds shown in Table 1, compound Nos. 1, 2 and 5 were selected and used to prepare composition Nos. I and II as shown in Table 6, in the same manner as in Example 1. The blend ratios were the same as these Examples.

In composition No. I, the components were selected so that the tilt senses of all compounds were the same (−) and some of the materials had opposite stereosenses from the others to form a blended material with a mixture of stereosenses. Composition No. I apparently shows a good response speed (ref. Example 1), hysteresis characteristics (threshold value (determined at 40° C.) and VM, ref. Table 6 shown below).

TABLE 6

| Composition No. | Compound No. | Blend Ratio (wt %) | Absolute Configuration | Stereo-Sense | V1 | V2 | V3 | V4 | VM |
|---|---|---|---|---|---|---|---|---|---|
| I | 2 | 16 | R | + | 25 | 31 | 11 | 3 | 2.3 |
| | 5 | 68 | R | + | | | | | |
| | 1 | 16 | R | − | | | | | |
| II | 2 | 16 | R | + | 35 | 47 | 25 | 3 | 0.8 |
| | 5 | 68 | R | + | | | | | |
| | 1 | 16 | S | + | | | | | |

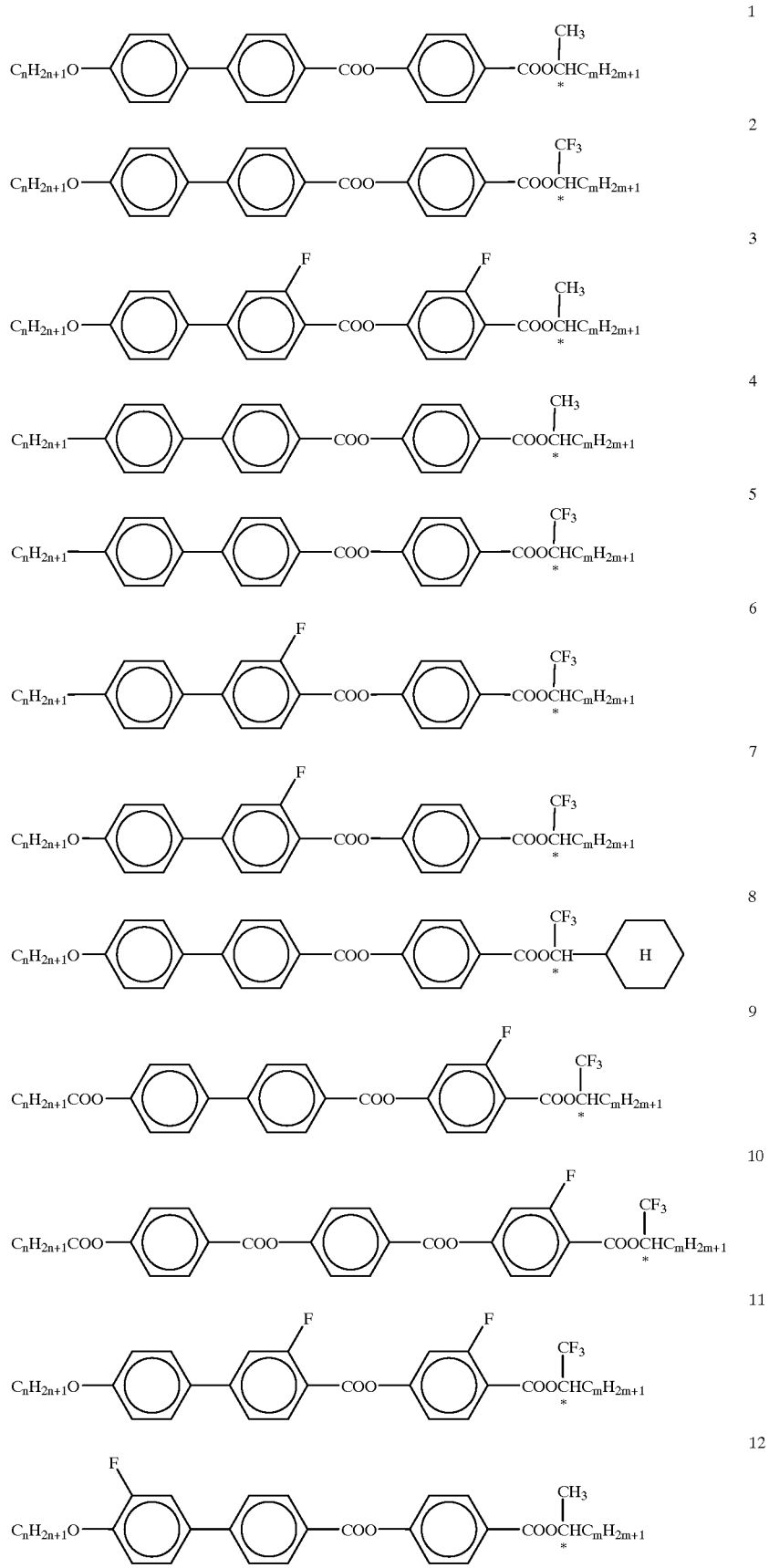

-continued
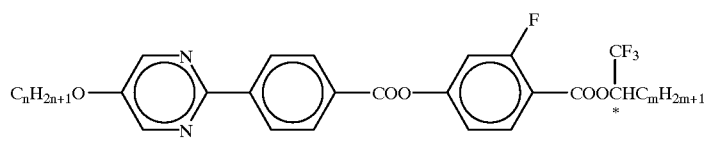
13
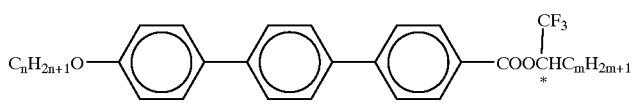
14
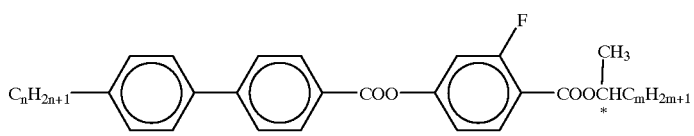
15
20
3. The composition according to claim 1, wherein the liquid crystal composition-constituting compounds having the same tilt sense (−) are selected from R enantiomers of the compounds represented by the following constitutional formulae, wherein n is an integer selected from 4 to 14, and m is an integer selected from 2 to 14.:
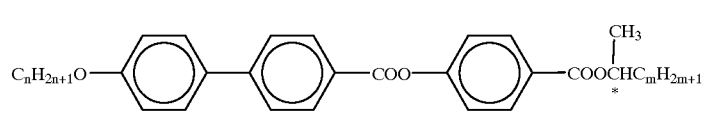
1
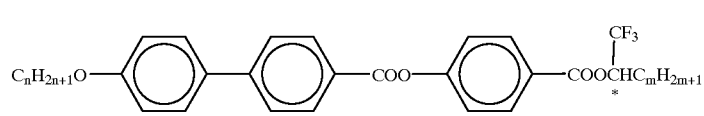
2
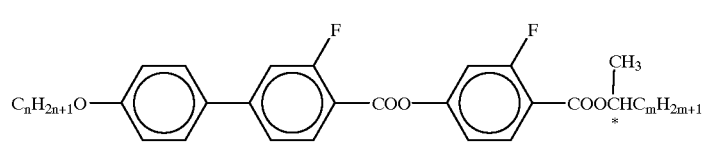
3
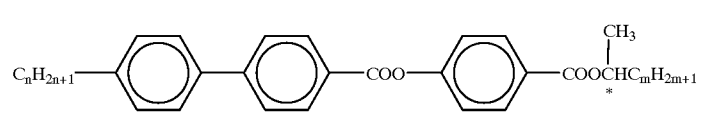
4
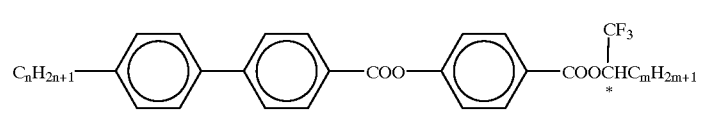
5
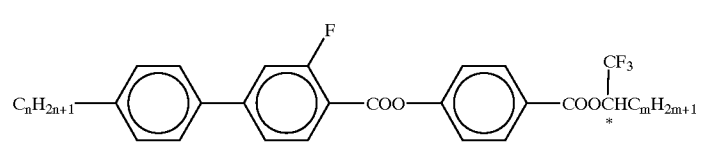
6
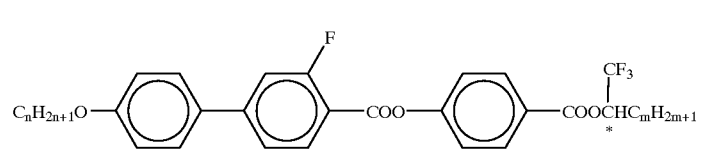
7
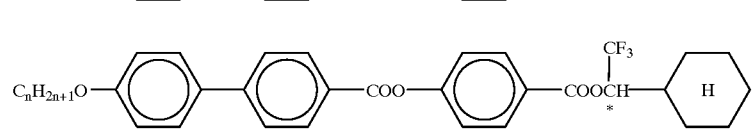
8

-continued

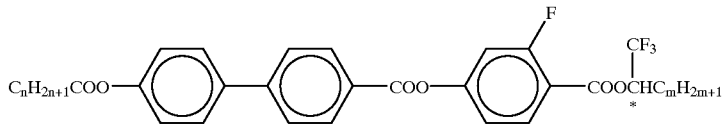
9

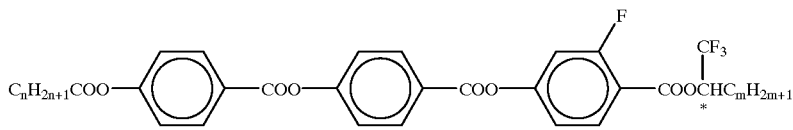
10

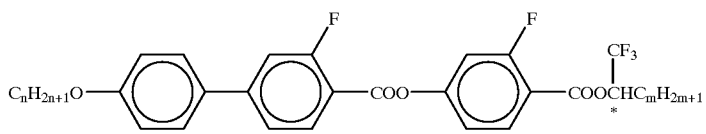
11

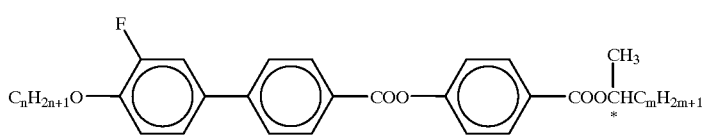
12

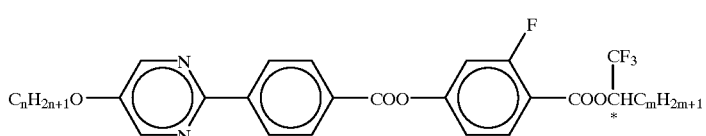
13

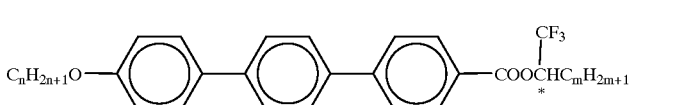
14

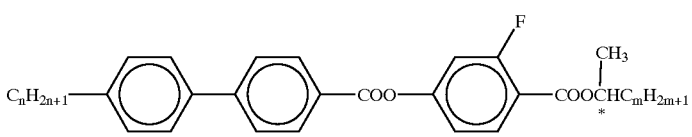
15

4. The composition according to claim 1, wherein the proportion of the liquid crystal composition-constituting compound having the same tilt sense is not less than 70 wt %.

5. The composition according to claim 1, wherein the proportion of the compound having the stereosense (+) is 1 to 99 wt % and the proportion of the compound having the stereosense (−) is 1 to 99 wt %.

6. The composition according to claim 1, wherein the compound having the stereosense (+) is selected from the R enantiomers of the following formulae No. 16 to 25 and S modifications of the following formulae No. 26 to 30, and the compound having the stereosense (−) is selected from the S enantiomers of the following constitutional formulae No. 16 to 25 and R modifications of the following formulae No. 26 to 30, wherein n is an integer selected from 4 to 14 and m is an integer selected from 2 to 14, provided that in formula 30, m is an integer selected from 3 to 14.

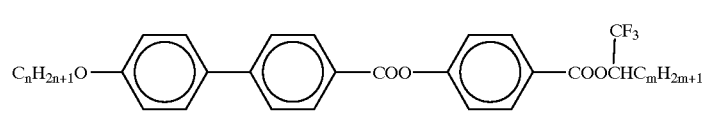
16

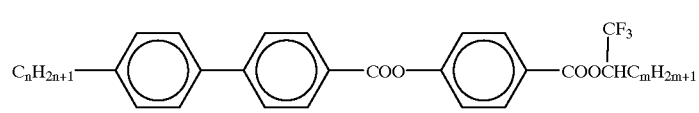
17

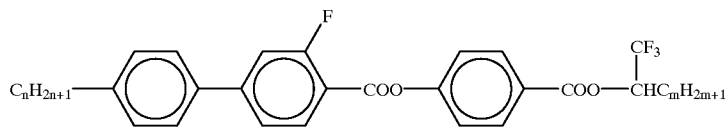
18
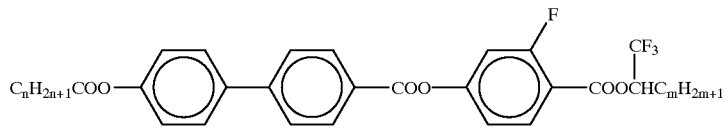
19
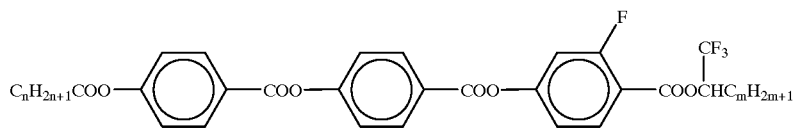
20
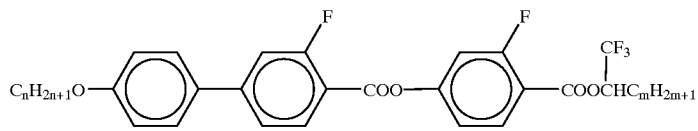
21
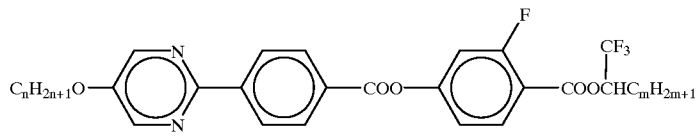
22
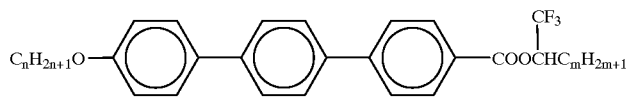
23
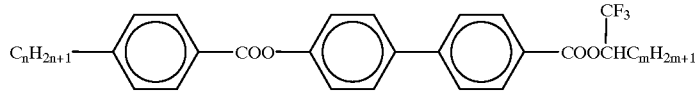
24
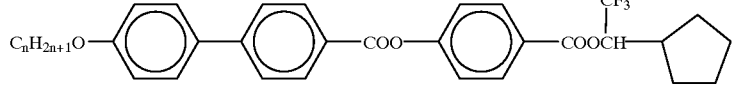
25
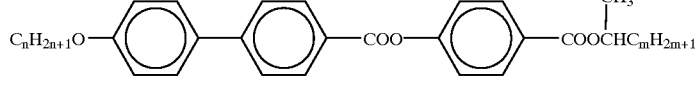
26
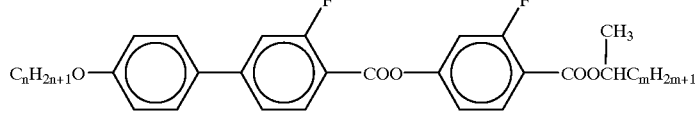
27
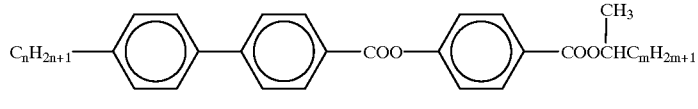
28
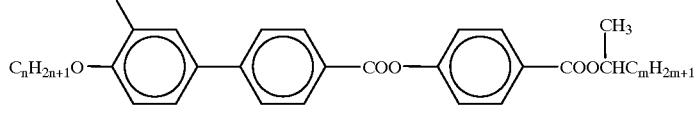
29

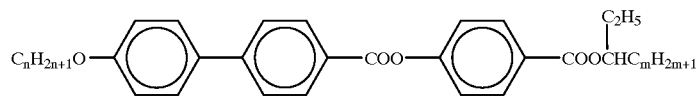

(30)

7. The composition according to claim 1, wherein the composition has a value of VM larger than 2.

8. The antiferroelectric liquid crystal composition according to claim 1, wherein the composition has a saturation value of spontaneous polarization of not less than 200 nC/cm$^2$.

9. A liquid crystal indication element comprising the liquid crystal composition according to claim 1.

* * * * *